Feb. 9, 1971 T. W. CHILDERS ET AL 3,562,014
PIPELINE SCRAPER LAUNCHING SYSTEM
Filed May 16, 1969
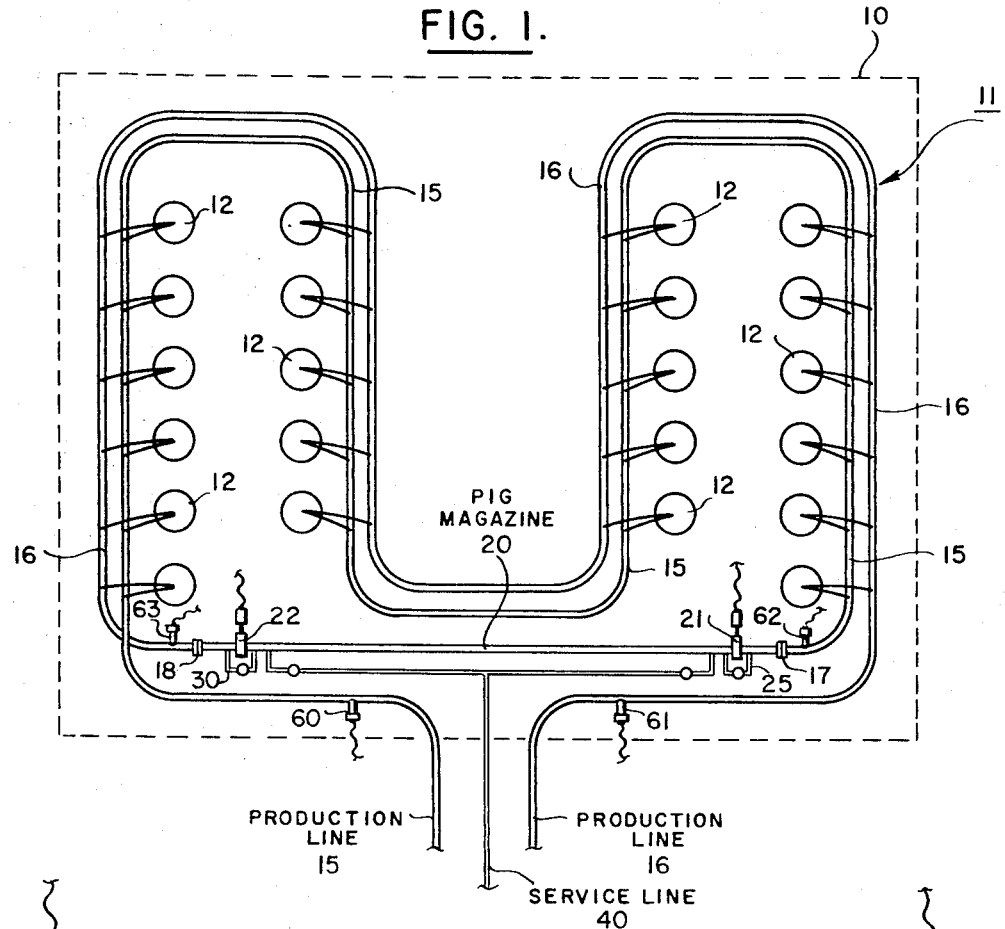
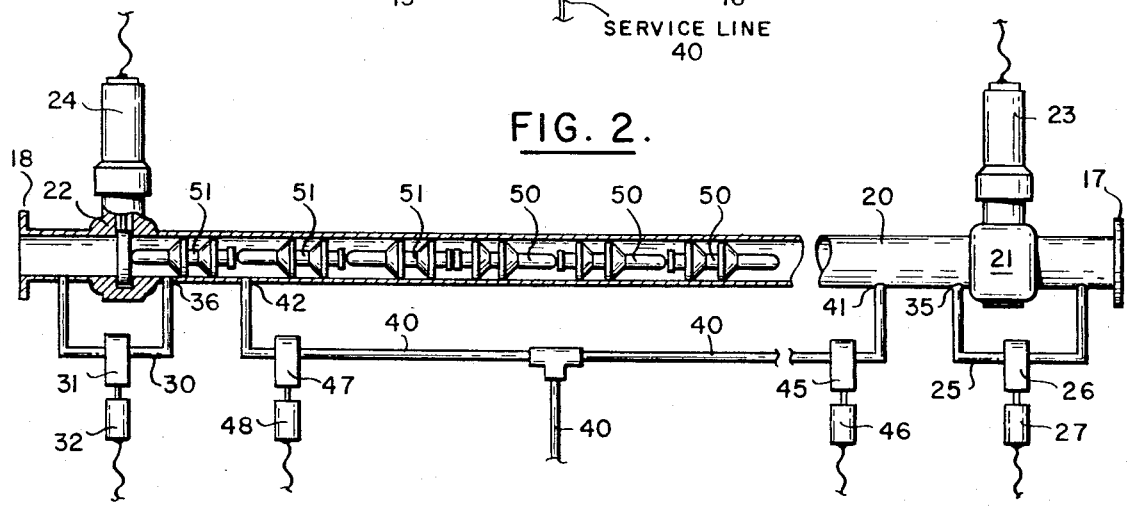
INVENTORS.
JOSEPH A. BURKHARDT,
THOMAS W. CHILDERS,
BY John S. Schneider
ATTORNEY.

United States Patent Office 3,562,014
Patented Feb. 9, 1971

3,562,014
PIPELINE SCRAPER LAUNCHING SYSTEM
Thomas W. Childers, Woodland Hills, and Joseph A. Burkhardt, Chatsworth, Calif., assignors to Esso Production Research Company
Filed May 16, 1969, Ser. No. 825,284
Int. Cl. B08b 9/04
U.S. Cl. 134—8
25 Claims

ABSTRACT OF THE DISCLOSURE

A pipeline scraper launcher for submerged oil and gas well production systems. A tubular magazine is arranged in a submerged oil and gas well production system and each end thereof is connected to a production pipeline which extends to the surface. A service conduit connects the interior of the tubular magazine to the surface. A plurality of pipeline scraper pigs are pumped into the tubular magazine through one of the production pipelines. Then, by proper manipulation of valves arranged on the tubular magazine and service conduit and application of fluid pressure, each scraper pig is hydraulically launched from the tubular magazine into either one of the production pipelines.

BACKGROUND OF THE INVENTION

Field of the invention

The present invention concerns cleaning pipelines, and in particular, production pipelines which extend from submerged oil and gas well production systems to the water's surface.

Description of the prior art

Cleaning production pipelines connected to submerged oil and gas well production systems to remove paraffin deposition, scale and other debris and maintain such pipelines for large flow volumes using present techniques requires the services of a diver to load or reload the scraper pigs used to clean the pipelines into a submerged magazine. When the submerged production system is located in deep water, the services of divers are expensive and such operations are hazardous. Further, only submerged production systems limited to diver-accessible depths could be used.

The aforementioned disadvantages in using present production pipe cleaning techniques are overcome by the remotely operated pipeline scraper launching system of the present invention which is capable of being operated without diver assistance in launching scrapers or in loading or reloading of the scraper magazine.

SUMMARY OF THE INVENTION

In accordance with the teachings of the present invention, the apparatus for launching pipeline scrapers into a pipeline includes a tubular magazine for containing a plurality of pipeline scraper pigs. Each end of the tubular magazine is connected to a pipeline and a remotely operable magazine valve is arranged on each end of the tubular magazine for opening and closing passage of fluid therethrough. A bypass passageway provided with a remotely operable valve for opening and closing the bypass passageway is connected to the tubular magazine at each end thereof for bypassing fluid past the magazine valves. A service conduit is connected to each end of the tubular magazine and provided with valves for controlling flow of fluid to and from each end of the tubular magazine through the service conduit. Signaling devices may be located in the pipelines for indicating the positions of a scraper pig (or scraper pigs) in the pipelines.

In operation of the apparatus, a plurality of scraper pigs are laced in one of the pipe lines and pumped toward the tubular magazine with fluid circulation being through the one pipeline and the tubular magazine and the other pipeline. When the scraper pigs approach the tubular magazine the valves are actuated to close the end of the tubular magazine opposite the end through which the scraper pigs are approaching the tubular magazine, and open the bypass at the closure end with fluid circulation thereafter being through the bypass and into the other pipeline. After all of the scraper pigs are located within the tubular magazine, the end through which the scraper pigs entered the tubular magazine is closed. When it is desired to pump a scraper pig from the tubular magazine and through one of the pipelines, the end of the tubular magazine whence the scraper pig is to be launched is opened and fluid is pumped through the service conduit into that end of the tubular magazine to hydraulically force the scraper pig into the one pipeline. The process is repeated as desired.

When only one pipeline is used, launching is achieved in the same manner; however, to load or reload the tubular magazine, fluid circulation is through the pipeline and tubular magazine and then through the service conduit.

BRIEF DESCRIPTION OF THE DRAWING

FIG. 1 is a top view illustrating schematically a manifold piping system arranged on a submerged oil and gas well production platform;

FIG. 2 illustrates the scraper pig launching portion of the submerged oil and gas well production system illustrated in FIG. 1; and FIG. 3 is a view illustrating one type of scraper pig which may be used.

DESCRIPTION OF THE PREFERRED EMBODIMENT

Referring to the drawings, in FIG. 1 there is shown a submerged platform or template 10 on which is arranged a manifold piping system formed by two production pipelines 15 and 16 which encircle wellheads 12 running in opposite directions. Pipelines 15 and 16 extend to the water's surface, not shown. The submerged flanged terminal ends 17 and 18 of pipelines 15 and 16, respectively, are located on opposite sides of template 10. A scraper pig launching tubular magazine 20 is installed between the terminal ends 17, 18 of these pipeline headers. A remotely operated valve 21, controlled by valve actuator 23, is arranged on one end of tubular magazine 20 for opening and closing fluid communication between pipeline 15 and tubular magazine 20 and a remotely operated valve 22, controlled by valve actuator 24, is arranged on the other end of tubular magazine 20 for opening and closing fluid communication between pipeline 16 and tubular magazine 20.

As shown more clearly in FIG. 2, tubular magazine 20 is made up of pipe the same diameter as the diameters of production pipelines 15 and 16. Valve 21 is provided with a bypass passageway 25 on which is located a remotely operated valve 26 controlled by valve actuator 27. Also, valve 22 is provided with a bypass passageway 30 in which is arranged a remotely operated valve 31 controlled by a valve actuator 32. Each bypass connection on the magazine side of the valves 21 and 22 is located as close as possible to the valve gate, as indicated at 35 for valve 21 and at 36 for valve 22. Service conduit 40 connects the water's surface to tubular magazine 20 at two spaced-apart locations, indicated at 41 and 42. Each such connection is located approximately one scraper pig length from the gate valve face. A remotely operated valve 45, controlled by valve actuator 46, is arranged on the conduit 40 adjacent connection 41. Similarly, a remotely operated valve 47, controlled by valve actuator 48, is arranged on conduit 40 adjacent connection 42. Two sets of scraper pigs, faced in opposite directions to each other, are arranged in tubular magazine 20. One set, scraper pigs 50, is positioned for exit through valve 21 and the other set, scraper pigs 51, is positioned for exit through valve 22. The scraper pigs may be identical in structure and as shown, for example, in FIG. 3, each preferably comprises two spaced-apart cup-shaped members 52 and at least one disk-shaped scraper brush 53, all connected together on an axial rod or tube 54. The number of pigs placed in the magazine 20 would, of course, be dependent upon the length of the magazine and the length of each pig.

The remotely operated valves and valve actuators may be any of the commercially available types. Each valve is preferably a full opening, automatically operated gate valve controlled by, for example, an electric motor or hydraulically or pneumatically with or without spring biasing means.

Signaling devices 60 and 61 are placed on production pipelines 15 and 16, respectively, near manifold 11, as seen in FIG. 1, to indicate when the scraper pigs reach (or exit from) the submerged manifold piping system. Similar signaling devices 62 and 63 may be placed on production pipelines 15 and 16, respectively, near the ends of tubular magazine 20 for the purpose of indicating when the scraper pig or pigs have entered or have exited from tubular magazine 20. The signaling devices are also commercially available. Such devices give positive indication of passage of scraper pig(s) with an electrical or pneumatic signal and preferably are of the automatic reset type.

OPERATION

Referring to both FIGS. 1 and 2, the two sets of scraper pigs are inserted in pipeline 15 at the water's surface or remote surface facility with half facing in one direction and half facing in an opposite direction. Magazine valves 21 and 22 are opened and the two sets of scraper pigs 50 and 51 are pumped through production line 15 to the submerged production manifold 11. The circulation flowpath is through pipeline 15, tubular magazine 20 and pipeline 16. When electrical signal device 60 gives an indication that the scraper pigs have reached production manifold 11, bypass valve 31 is opened by valve actuator 32 and magazine valve 22 is closed by valve actuator 24. Such valve operations are preferably automatically performed. Electrical signal device 62 may be used to indicate the position of the scraper pigs as they pass into tubular magazine 20. Pumping is continued until pressure buildup indicates that all scraper pigs are located in tubular magazine 20. Valve 21 is then closed by valve actuator 23 and bypass valve 31 is closed by valve actuator 32 and pumping through pipeline 15 is discontinued. When it is desired to clean a pipeline, as for example, production pipeline 16, valves 22 and 47 are opened by valve actuators 24 and 48, respectively. Fluid pressure is then applied to lead scraper pig 51 by pumping fluid from the waters surface through service conduit 40 and valve 47 to isolate and propel the lead scraper pig out of magazine 20 into production pipeline 16 through open valve 22. Signal device 63 indicates the passage of this scraper pig from magazine 20 and pumping is continued through conduit 40 until scraper pig 51 passes the other signal device 61 which indicates that scraper pig 51 has passed through production manifold 11. Scraper pig 51 is then forced through production pipeline 16 to a terminal by pressure of the production fluids from wellheads 12. Valves 22 and 47 are then closed.

When it is desired to launch the next scraper pig 51, valve 45 is opened by valve actuator 46 and bypass valve 31 is opened by valve actuator 32 and slight fluid pressure applied through service conduit 40 at point 41 shifts the scraper pigs 50 and 51 against the face of gate valve 22. Valves 45 and 31 are then closed and the procedure for launching a scraper pig described above is repeated.

In a similar but reverse manner, scraper pigs 50 are launched into pipeline 15.

As indicated by dotted lines 56' and 57' in FIG. 3, the rear and/or nose ends of each scraper pig may be lengthened for proper positioning of the scraper pigs with respect to the connection points 41 and 42 of conduit 40. The service conduit is not only used to launch the scraper pigs, but also to shift them within the tubular magazine as required.

When only one production pipeline is available, the operation is the same as for the two pipeline operation, except one of the gate valves and one bypass passageway are eliminated. Loading and reloading of the tubular magazine is through the sole production pipeline which would be shut in and a set of scraper pigs pumped down the production pipeline to the submerged production system with fluid returns being taken through service conduit 40.

Signaling devices 60, 61 and 63 facilitate locating the positions of the scraper pig or pigs, but may be omitted as desired.

The launching system described herein with respect to submerged oil and gas well production systems may also be used with other pipeline systems installed either on land or offshore.

Having fully described the advantages, objects, apparatus and operation of our invention, we claim:

1. Apparatus for launching pipeline scraper pigs into a pipeline comprising:
   a tubular magazine for containing a plurality of said pipeline scraper pigs, said tubular magazine having approximately the same diameter as said pipeline and being connected to said pipeline at one end of said tubular magazine;
   a remotely operable magazine valve arranged on said one end of said tubular magazine for controlling flow of fluid and movement of said scraper pigs through said one end of said tubular magazine;
   a bypass passageway for bypassing fluid past said magazine valve;
   a remotely operable bypass valve arranged on said bypass passageway for controlling flow of fluid through said bypass passageway;
   a service conduit connected to the interior of said tubular magazine at each end of said tubular magazine, one of said service conduit connections being located a selected distance from said magazine valve; and
   a service conduit valve arranged on said service conduit adjacent each end of said tubular magazine for controlling flow of fluid into and from each end of said tubular magazine.

2. Apparatus as recited in claim 1 in which said selected distance of said one service conduit connection from said magazine valve is approximately one scraper pig length.

3. Apparatus as recited in claim 2 in which each scraper pig comprises at least two spaced-apart cup-shaped members, a brush arranged between said cup-shaped members and an axial member attaching said cup-shaped members and said brush to each other.

4. Apparatus as recited in claim 3 including signaling means connected to said pipeline at at least one selected location thereof for indicating passage of a scraper pig or scraper pigs through said pipeline past said selected location.

5. Apparatus as recited in claim 4 wherein said pipeline connects a submerged production system to the water's surface and said tubular magazine is submerged.

6. Apparatus for launching pipeline scraper pigs into a pipeline comprising:
   a tubular magazine for containing a plurality of said pipeline scraper pigs;
   a first pipeline connected to one end of said tubular magazine;

a second pipeline having approximately the same diameter as said first pipeline connected to the other end of said tubular magazine, said tubular magazine being approximately the same diameter as said first and said second pipelines;

a first remotely operable valve arranged on one end of said tubular magazine for controlling flow of fluid and movement of said scraper pigs through said one end of said tubular magazine;

a second remotely operable valve arranged on the other end of said tubular magazine for controlling flow of fluid and movement of said scraper pigs through said other end of said tubular magazine;

a first bypass passageway for bypassing fluid past said first valve;

a second bypass passageway for bypassing fluid past said second valve;

a third remotely operable valve arranged on said first bypass passageway for controlling flow of fluid through said first bypass passageway;

a fourth remotely operable valve arranged on said second bypass passageway for opening and closing said second bypass passageway;

a service conduit connecting the interior of said tubular magazine at each end thereof, one of said service conduit connections to said tubular magazine being located a selected distance from said first valve and said other service conduit connection to said tubular magazine being located said selected distance from said second valve;

a fifth remotely operable valve arranged on said service conduit adjacent one end of said tubular magazine for controlling flow of fluid into and from said one end of said tubular magazine; and a sixth remotely operable valve arranged on said service conduit adjacent the other end of said tubular magazine for controlling flow of fluid into and from said other end of said tubular magazine.

7. Apparatus as recited in claim 6 in which each of said selected distances of said service conduit connection from said magazine valve is approximately one scraper pig length.

8. Apparatus as recited in claim 7 in which each scraper pig comprises at least two spaced apart cup-shaped members, a brush arranged between said cup-shaped members and an axial member attaching said cup-shaped members and said brush to each other.

9. Apparatus as recited in claim 8 including signal means connected to said pipeline at at least one selected location thereof for indicating passage of a scraper pig or pigs through said pipeline past said selected location.

10. Apparatus as recited in claim 9 wherein said pipelines connect a submerged production system to the water's surface and said tubular magazine is submerged.

11. A method for remotely launching pipeline scraper pigs contained in a tubular magazine which includes at least one pipeline connected to one end of said tubular magazine, said tubular magazine being provided with a remotely operable magazine valve for controlling flow of fluid and movement of said scraper pigs into and from said tubular magazine, a bypass passageway provided with a remotely operable valve for controlling the flow of fluid therethrough for bypassing said magazine valve and a service conduit connected to each end of said tubular magazine and provided with remotely operable valves for controlling the flow of fluid through said service conduit comprising the steps of: pumping fluid through said service conduit into the other end of said tubular magazine while maintaining said magazine valve closed and said bypass valve open to move said scraper pigs against the face of said closed magazine valve; and then opening said magazine valve and closing said bypass valve and pumping fluid through said service conduit into said one end of said tubular magazine to isolate and launch at least one of said scraper pigs into said pipeline .

12. A method as recited in claim 11 including following launching of said scraper pig into said pipeline, closing said magazine valve and opening said bypass valve and pumping fluid through said service conduit into said other end of said tubular magazine to move said scraper pigs against the face of said closed magazine valve.

13. A method as recited in claim 12 in which said tubular magazine is submerged and said pipeline connects a submerged oil and gas well production system to the water's surface.

14. A method for remotely loading pipeline scraper pigs into a tubular magazine and launching said scraper pigs from said tubular magazine into a pipeline system which includes at least one pipeline connected to one end of said tubular magazine, said tubular magazine being provided with a remotely operable magazine valve for controlling flow of fluid and movement of said scraper pigs into and from said tubular magazine, a bypass passageway provided with a remotely operable valve for controlling the flow of fluid therethrough for bypassing said magazine valve and a service conduit connected to each end of said tubular magazine and provided with remotely operable valves for controlling the flow of fluid through said service conduit comprising the steps of:

pumping said scraper pigs through said pipeline into said tubular magazine while maintaining said magazine valve open and said bypass valve closed with fluid circulation being through said pipeline, through said tubular magazine and through said service conduit;

establishing that said scraper pigs are located in said tubular magazine;

closing said magazine valve and opening said bypass valve and pumping fluid through said service conduit into the other end of said tubular magazine to move said scraper pigs against the face of said closed magazine valve;

then opening said magazine valve and closing said bypass valve and pumping fluid through said service conduit into said one end of said tubular magazine to isolate and launch at least one of said scraper pigs into said pipeline; and establishing that said one scraper pig has been launched into said pipeline.

15. A method as recited in claim 14 including following launching of said scraper pig into said pipeline, closing said magazine valve and opening said bypass valve and pumping fluid through said service conduit into said other end of said tubular magazine to move said scraper pigs against the face of said closed magazine valve.

16. A method as recited in claim 15 in which said tubular magazine is submerged and said pipeline connects a submerged oil and gas well production system to the water's surface.

17. A method for remotely launching pipeline scraper pigs contained in a tubular magazine into a pipeline system which includes two pipelines, one of said pipelines being connected to one end of said tubular magazine and the other of said pipelines being connected to the other end of said tubular magazine, said tubular magazine being provided with a first remotely operable valve arranged on one end of said tubular magazine for controlling flow of fluid and movement of said scraper pigs through said one end of said tubular magazine and a second remotely operable valve arranged on the other end of said magazine for controlling flow of fluid and movement of said scraper pigs through said other end of said magazine, a first bypass passageway provided with a first remotely operable valve for controlling the flow of fluid therethrough for bypassing said first valve, a second bypass passageway provided with a second remotely operable valve for controlling the flow of fluid therethrough for bypassing said second valve and a service conduit connected to each end of said tubular magazine and provided with valves for controlling the flow of fluid through said service conduit comprising the steps of:

pumping fluid through said service conduit into the other end of said tubular magazine while maintaining said first and second magazine valves closed and said second bypass open to move said scraper pigs against the face of said second closed magazine valve; and then opening said second magazine valve and closing said second bypass valve and pumping fluid through said service conduit into the other end of said tubular magazine to isolate and launch at least one of said scraper pigs into said other pipeline.

18. A method as recited in claim 17 in which said tubular magazine is submerged and said pipeline connects a submerged oil and gas well production system to the water's surface.

19. A method as recited in claim 18 including following launching of said scraper pig into said other pipeline, closing said second magazine valve and opening said second bypass valve and pumping fluid through service conduit into said one end of said tubular magazine to move said scraper pigs against the face of said second closed valve.

20. A method as recited in claim 18 including following launching of said scraper pig into said other pipeline, closing said second magazine valve and opening said first bypass valve and pumping fluid through said service conduit into said other end of said tubular magazine to move said scraper pigs against the face of said first closed valve.

21. A method for remotely loading pipeline scraper pigs into a tubular magazine and launching said scraper pigs from said tubular magazine into a pipeline system which includes two pipelines, one of said pipelines being connected to one end of said tubular magazine and the other of said production pipelines being connected to the other end of said tubular magazine, said tubular magazine being provided with a first remotely operable valve at one end thereof for controlling flow of fluid and movement of said scraper pigs into and from said tubular magazine and a second remotely operable valve at the other end thereof for controlling flow of fluid and movement of said scraper pigs into and from said tubular magazine, a first bypass passageway provided with a first remotely operable valve for controlling the flow of fluid therethrough for bypassing said first magazine valve, a second bypass passageway provided with a second remotely operable valve for controlling the flow of fluid therethrough for bypassing said second magazine valve and a service conduit connected to each end of said tubular magazine and provided with valves for controlling the flow of fluid through said service conduit comprising the steps of:

pumping said scraper pigs through said one pipeline into said tubular magazine while maintaining said first and second magazine valves open and said bypass valves closed with fluid circulation being through said one pipeline, through said tubular magazine and through said other pipeline;

establishing that said scraper pigs are located in said tubular magazine;

then opening said second magazine valve and closing said second bypass valve and pumping fluid down said service conduit into said other end of said tubular magazine to isolate and launch at least one of said scraper pigs into said other production pipeline; and establishing by remote signaling means that said scraper pig has been launched into said other production pipeline.

22. A method as recited in claim 21 including between the steps of pumping said scraper pigs through said one pipeline into said tubular magazine and opening said second magazine valve and closing said second bypass valve and pumping fluid down said service conduit into said other end of said tubular magazine the steps of closing said first and second magazine valves and opening said second bypass valve and pumping fluid down said service conduit into the other end of said tubular magazine to move said scraper pigs against the face of said second magazine valve.

23. A method as recited in claim 22 in which said tubular magazine is submerged and said pipelines connect a submerged oil and gas well production system to the water's surface.

24. A method as recited in claim 23 including following launching of said scraper pig into said other pipeline, closing said second magazine valve and opening said second bypass valve and pumping fluid through said service conduit into the other end of said tubular magazine to move said scraper pigs against the face of said closed second magazine valve.

25. A method as recited in claim 23 including following launching of said scraper pig into said other pipeline, closing said second magazine valve and opening said first bypass valve and pumping fluid through said service conduit into said one end of said tubular magazine to move said scraper pigs against the face of said closed first magazine valve.

References Cited

UNITED STATES PATENTS

| | | | |
|---|---|---|---|
| 3,158,888 | 12/1964 | Ericson | 15—104.06(A) |
| 3,266,076 | 8/1966 | Surber | 15—104.06(A) |

EDWARD L. ROBERTS, Primary Examiner

U.S. Cl. X.R.

15—104.06; 134—22